(12) United States Patent
Gao et al.

(10) Patent No.: US 8,614,578 B2
(45) Date of Patent: Dec. 24, 2013

(54) ATTENUATION OF ELECTROMAGNETIC SIGNALS PASSING THROUGH CONDUCTIVE MATERIAL

(75) Inventors: Guozhong Gao, Watertown, MA (US); H. Frank Morrison, Berkeley, CA (US); Hong Zhang, El Sobrante, CA (US); Richard A. Rosthal, Richmond, CA (US); David Alumbaugh, Berkeley, CA (US); Cyrille Levesque, La Defense (FR)

(73) Assignee: Schlumberger Technology Corporation, Sugar Land, TX (US)

( * ) Notice: Subject to any disclaimer, the term of this patent is extended or adjusted under 35 U.S.C. 154(b) by 983 days.

(21) Appl. No.: 12/641,898

(22) Filed: Dec. 18, 2009

(65) Prior Publication Data

US 2010/0321023 A1     Dec. 23, 2010

Related U.S. Application Data

(60) Provisional application No. 61/218,333, filed on Jun. 18, 2009.

(51) Int. Cl.
    *G01V 3/10*            (2006.01)
    *G01V 3/18*            (2006.01)

(52) U.S. Cl.
USPC ........... 324/341; 324/323; 324/325; 324/326; 324/327; 324/328; 324/329; 324/330; 324/331; 324/332; 324/333; 324/370; 324/371; 324/372; 324/373; 324/374; 324/375; 343/703; 343/709; 343/718; 343/719; 367/1; 367/2; 367/3; 367/4; 367/50; 367/53; 367/43; 367/44; 367/86; 166/244.1; 166/403; 73/152.01; 73/152.62; 250/253; 250/254; 250/255; 250/265; 250/266; 702/1; 702/2; 702/10; 702/17; 702/18

(58) Field of Classification Search
USPC .......... 324/323–375; 343/703, 709, 718–719; 367/1–86; 166/244.1–403; 73/152.01–152.62; 250/253–266; 702/1–18
See application file for complete search history.

(56) References Cited

U.S. PATENT DOCUMENTS 4,484,470 A * 11/1984 Fertl et al. .................. 73/152.14
4,524,325 A * 6/1985 Moore et al. ................... 324/375

(Continued)

FOREIGN PATENT DOCUMENTS

WO    WO2009158189      12/2009

OTHER PUBLICATIONS

Lee, K.H. et al., Electromagnetic method for analyzing the property of steel casing, Lawrence Berkeley National Laboratory, 1998.

(Continued)

*Primary Examiner* — Patrick Assouad
*Assistant Examiner* — Lamarr Brown
(74) *Attorney, Agent, or Firm* — Jeremy Berman

(57) ABSTRACT

The present disclosure relates to determining the attenuation of an electromagnetic signal passing through a conductive material. An antenna is provided and placed in relatively close proximity to the conductive material. An alternating current is passed through the antenna and the impedance of the antenna is measured. The attenuation is determined using the measured impedance. A single frequency measurement may be made, or multiple measurements using different frequencies may be made. Grouped parameters based on properties of the material and the frequency of the current are used to relate the coil impedance to the attenuation. A current frequency for which the ratio of the antenna's resistive part of the impedance to the angular frequency of the current is substantially insensitive to at least one of the parameters is preferred.

21 Claims, 10 Drawing Sheets

(56) References Cited

U.S. PATENT DOCUMENTS

| | | | |
|---|---|---|---|
| 4,524,829 A * | 6/1985 | Hanlon et al. | 166/294 |
| 4,575,678 A * | 3/1986 | Hladky | 205/776 |
| 4,676,310 A * | 6/1987 | Scherbatskoy et al. | 340/853.4 |
| 4,899,112 A * | 2/1990 | Clark et al. | 324/338 |
| 4,901,023 A * | 2/1990 | Vail, III | 324/339 |
| 4,940,943 A * | 7/1990 | Bartel et al. | 324/338 |
| 5,043,669 A * | 8/1991 | Vail, III | 324/368 |
| 5,045,795 A * | 9/1991 | Gianzero et al. | 324/342 |
| 5,055,676 A * | 10/1991 | Roscoe et al. | 250/269.7 |
| 5,057,844 A * | 10/1991 | Rothstein | 342/51 |
| 5,585,727 A * | 12/1996 | Fanini et al. | 324/339 |
| 5,798,982 A * | 8/1998 | He et al. | 367/73 |
| 5,841,280 A * | 11/1998 | Yu et al. | 324/323 |
| 5,841,281 A * | 11/1998 | Beard et al. | 324/339 |
| 5,841,282 A * | 11/1998 | Christy et al. | 324/347 |
| 6,020,741 A * | 2/2000 | Heysse et al. | 324/339 |
| 6,234,250 B1 * | 5/2001 | Green et al. | 166/250.03 |
| 6,294,917 B1 * | 9/2001 | Nichols | 324/339 |
| 6,515,480 B1 * | 2/2003 | Belew et al. | 324/326 |
| 6,671,623 B1 * | 12/2003 | Li | 702/7 |
| 7,030,617 B2 | 4/2006 | Conti | |
| 7,107,153 B2 | 9/2006 | Kisra et al. | |
| 2002/0016678 A1 * | 2/2002 | Haugland | 702/7 |
| 2002/0060570 A1 * | 5/2002 | Shirasaka et al. | 324/338 |
| 2002/0075001 A1 * | 6/2002 | Goodman | 324/326 |
| 2002/0105332 A1 * | 8/2002 | Rosthal et al. | 324/338 |
| 2002/0122352 A1 * | 9/2002 | Khan | 367/57 |
| 2002/0186013 A1 * | 12/2002 | Tabarovsky et al. | 324/343 |
| 2003/0030439 A1 * | 2/2003 | Gao et al. | 324/339 |
| 2003/0080744 A1 * | 5/2003 | Goldfine et al. | 324/345 |
| 2003/0155923 A1 * | 8/2003 | Omeragic et al. | 324/338 |
| 2003/0184302 A1 * | 10/2003 | Omeragic et al. | 324/338 |
| 2003/0184303 A1 * | 10/2003 | Homan et al. | 324/339 |
| 2003/0184304 A1 * | 10/2003 | Homan et al. | 324/343 |
| 2003/0209347 A1 * | 11/2003 | Clark et al. | 166/250.01 |
| 2004/0019427 A1 * | 1/2004 | San Martin et al. | 702/6 |
| 2004/0073370 A1 * | 4/2004 | Dasgupta et al. | 702/6 |
| 2004/0160223 A1 * | 8/2004 | McElhinney | 324/346 |
| 2004/0163443 A1 * | 8/2004 | McElhinney | 73/1.79 |
| 2004/0178794 A1 * | 9/2004 | Nelson | 324/323 |
| 2004/0207403 A1 * | 10/2004 | Fanini et al. | 324/339 |
| 2004/0210394 A1 * | 10/2004 | Trappe et al. | 702/14 |
| 2004/0249573 A1 * | 12/2004 | McElhinney | 702/7 |
| 2004/0250614 A1 * | 12/2004 | Ander | 73/152.05 |
| 2005/0024990 A1 * | 2/2005 | Laake | 367/38 |
| 2005/0036403 A1 * | 2/2005 | Leggett et al. | 367/32 |
| 2005/0088181 A1 * | 4/2005 | Barber et al. | 324/346 |
| 2005/0116872 A1 * | 6/2005 | Minami et al. | 343/788 |
| 2005/0236152 A1 * | 10/2005 | Siebrits et al. | 166/250.1 |
| 2005/0256644 A1 * | 11/2005 | Xiao | 702/7 |
| 2005/0274512 A1 * | 12/2005 | Tabarovsky et al. | 166/254.2 |
| 2005/0279161 A1 * | 12/2005 | Chen et al. | 73/152.05 |
| 2005/0283315 A1 * | 12/2005 | Haugland | 702/6 |
| 2006/0023569 A1 * | 2/2006 | Agullo et al. | 367/73 |
| 2006/0103388 A1 * | 5/2006 | Forgang et al. | 324/338 |
| 2006/0155475 A1 * | 7/2006 | Yin | 702/14 |
| 2006/0250136 A1 * | 11/2006 | Benimeli et al. | 324/347 |
| 2006/0256658 A1 * | 11/2006 | Christie et al. | 367/43 |
| 2006/0291327 A1 * | 12/2006 | Barakat | 367/14 |
| 2006/0291328 A1 * | 12/2006 | Robertsson et al. | 367/24 |
| 2007/0035305 A1 * | 2/2007 | Itskovich et al. | 324/355 |
| 2007/0046290 A1 * | 3/2007 | Bespalov et al. | 324/367 |
| 2007/0282561 A1 * | 12/2007 | Beckwith | 702/127 |
| 2007/0284098 A1 * | 12/2007 | Miller, Jr. | 166/250.01 |
| 2007/0286019 A1 * | 12/2007 | Love et al. | 367/25 |
| 2007/0289741 A1 * | 12/2007 | Rambow | 166/250.01 |
| 2007/0290684 A1 * | 12/2007 | Edwards | 324/312 |
| 2007/0297286 A1 * | 12/2007 | Stenzel et al. | 367/20 |
| 2008/0073580 A1 * | 3/2008 | Phaneuf et al. | 250/492.21 |
| 2008/0074336 A1 * | 3/2008 | Signorelli et al. | 343/719 |
| 2008/0084219 A1 * | 4/2008 | Belkhayat et al. | 324/649 |
| 2008/0091356 A1 * | 4/2008 | Alumbaugh et al. | 702/11 |
| 2008/0111552 A1 * | 5/2008 | Brune et al. | 324/326 |
| 2008/0284440 A1 * | 11/2008 | Moore | 324/333 |
| 2008/0314587 A1 * | 12/2008 | Del Campo et al. | 166/264 |
| 2008/0315882 A1 * | 12/2008 | Seydoux et al. | 324/333 |
| 2008/0315883 A1 * | 12/2008 | Chemali et al. | 324/339 |
| 2008/0315884 A1 * | 12/2008 | Bittar et al. | 324/366 |
| 2008/0316859 A1 * | 12/2008 | Welker et al. | 367/17 |
| 2008/0316860 A1 * | 12/2008 | Muyzert et al. | 367/25 |
| 2008/0319674 A1 * | 12/2008 | Dai et al. | 702/6 |
| 2009/0005993 A1 | 1/2009 | Abubakar et al. | |
| 2009/0091328 A1 * | 4/2009 | Clark et al. | 324/338 |
| 2009/0157316 A1 * | 6/2009 | Alumbaugh et al. | 702/7 |
| 2009/0212777 A1 * | 8/2009 | Brune et al. | 324/329 |
| 2009/0254281 A1 | 10/2009 | Hruska et al. | |
| 2009/0281731 A1 * | 11/2009 | Morrison et al. | 702/7 |
| 2010/0097066 A1 | 4/2010 | Gao | |
| 2010/0134112 A1 * | 6/2010 | Zhang et al. | 324/339 |
| 2010/0259268 A1 * | 10/2010 | Zhang et al. | 324/339 |
| 2010/0277177 A1 * | 11/2010 | Alumbaugh et al. | 324/338 |
| 2010/0308832 A1 * | 12/2010 | Clark et al. | 324/338 |
| 2011/0001482 A1 * | 1/2011 | Alumbaugh et al. | 324/344 |
| 2011/0113887 A1 * | 5/2011 | De Lorenzo et al. | 73/649 |

OTHER PUBLICATIONS

Gao, G. et al., Practical implications of non-linear inversion for cross-well electromagnetic data collected in cased-wells, SEG Extended Abstract, 2008.

Haugland, S. et al., Fundamental analysis of the remote-field eddy-current effect, IEEE Transactions on Magnetics, vol. 32, No. 4, Jul. 1996.

Augustin, A.M. et al., A theoretical study of surface-to-borehole electromagnetic logging in cased holes, Geophysics, vol. 54, No. 1, Jan. 1989, pp. 90-100.

* cited by examiner

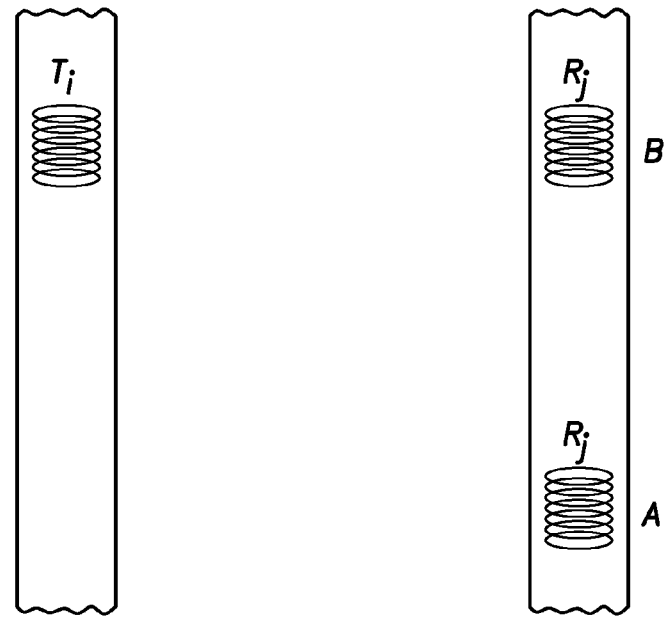
FIG. 1
(PRIOR ART)
FIG. 2
(PRIOR ART)
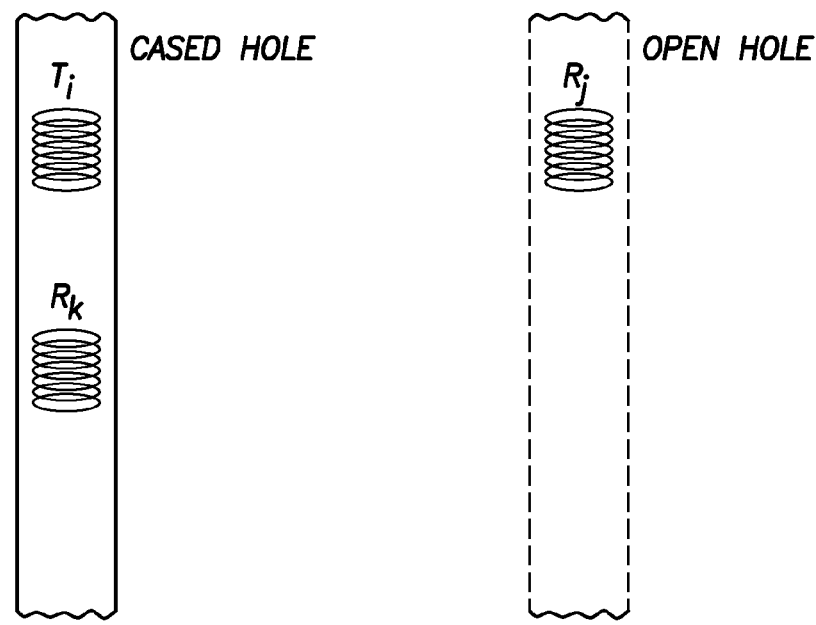

ATTENUATION OF ELECTROMAGNETIC SIGNALS PASSING THROUGH CONDUCTIVE MATERIAL

CROSS-REFERENCE TO OTHER APPLICATIONS

This application claims priority to and the benefit of U.S. Provisional Application No. 61/218,333, filed provisionally on Jun. 18, 2009.

TECHNICAL FIELD

The present application relates generally to the field of electromagnetic logging, and particularly to electromagnetic logging in the presence of conductive material, such as casing.

BACKGROUND

In the oil industry, electromagnetic (EM) induction surveys are used to map the electrical conductivity of geologic formations between boreholes and/or radially away from a single wellbore. The latter, usually referred to as induction logging, has been in routine use for over fifty years. Those surveys are performed in open holes; that is, holes that have not been lined with a (typically, metal) casing.

Recently, the concepts of induction logging have been extended to surveys between uncased wells and between wells cased with conductive liners. There is also interest in the use of logging between surface and downhole sensors, and within single wells that are cased with conductive liners. The conductive liners (casing) introduce several problems. For example, the signal from the transmitter to the receiver is severely attenuated upon passing through the conductive casing because of the casing's high conductivity and, usually, high magnetic permeability (high-mu or high-$\mu$). The conductivity, permeability, and thickness of the casing wall can vary along the length of the casing. Transmitters in these surveys are normally multi-turn solenoids that have a core of high magnetic permeability. At high current levels in the solenoid, the permeability of the core material, and of the surrounding casing itself, is driven into a nonlinear regime. Under those circumstances, the current in the solenoid is not proportional to the net radiated field. (Receivers may also use high-mu, cored solenoids, but because they never operate at the high field levels in which such nonlinear effects are seen, this is not a problem for them, in practice.)

The various types of induction surveys typically share many commonalities. A transmitter, usually a multi-turn coil of wire, carries an alternating current of frequency co (radians/sec). This creates a time-varying magnetic field in the surrounding formation that in turn, by Faraday's law, induces an electromotive force (emf). This emf drives currents in the formation that are basically proportional to the formation conductivity. Finally, a receiver is positioned either in the same hole as the transmitter, in another hole, or on the surface, and measures the magnetic field arising from the transmitter and the secondary, or induced, currents in the formation. Conventional induction logging always uses a combination of multiple receivers and/or multiple transmitters connected in series so as to cancel the mutual signal in air. In general, a theoretical model for a logging system embedded in a formation of arbitrary resistivity is used to match or interpret the received signals. In some applications, the absolute value of the average formation resistivity is not as important as the ability to map variations of resistivity within the formation.

To determine this spatial variation of formation resistivity, the surveys typically involve placing the transmitter at multiple locations in the hole and measuring the fields at multiple receiver locations for each transmitter location. In crosshole surveys, this yields a data set similar to those obtained from tomography.

There is a "window" of frequencies in which such surveys are practical. Below a certain frequency, the secondary fields from the formation are simply too small to be detected with practical receivers. Above a certain frequency, the casing attenuation obliterates the formation response. The frequency window depends greatly on the type of casing used. Carbon steel casing generally has a conductivity ($\sigma$) of approximately five million S/m and a relative permeability ($\mu_r$) of approximately 100. Chromium casing is essentially non-magnetic ($\mu_r$ is equal to or close to 1), and has a conductivity of approximately one million S/m. As a result, chromium casing is preferable because it attenuates the EM signal much less than the carbon steel casing, at the same frequency. Thus, for practical field systems in chromium cased boreholes, this window can be up to several hundred Hz, while in carbon steel cased boreholes, the frequency is limited to roughly up to one hundred Hz.

Recall, however, that even in those frequency windows, the casing properties (i.e., conductivity ($\sigma$), relative permeability ($\mu_r$), thickness (t), and inner/outer diameter) are not constant along the length of casing. Since the casing attenuation is so strong, small variations in the casing's properties produce variations in the fields seen by a receiver that are large compared to the variations expected from desired formation variations. A further problem is that the strength of the transmitter, known as its moment, must be known so that moment variations are not misinterpreted as variations in the formation conductivity.

There are prior attempts to eliminate, or correct for, those casing variations. Removing the casing effects from the measurements provides huge benefits on the image quality of an EM inversion/imaging. Consider the schematic for a crosswell survey (FIG. 1). The transmitter $T_i$ produces a field $B_{ij}$ at receiver $R_j$, which is the product of:

$$B_{ij} = M_i g_{ij} K^f_{ij} k_j k_i = G_{ij} K^f_{ij} k_j k_i \qquad (1)$$

The factors above include the moment (or strength), $M_i$, of transmitter $T_i$, and a purely geometric term, $g_{ij}$. Those two factors are combined to produce $G_{ij}$. The desired formation response, that is, the response from the induced currents if no casing were present, is represented by $K^f_{ij}$. The casing attenuation at the transmitter is represented by $k_i$, and the casing attenuation at the receiver is represented by $k_j$. It has been shown that the casing attenuation terms $k_i$ and $k_j$ are in fact multiplicative for simple (ideally point) transmitters and receivers operating in homogeneous casing.

One attempted solution to the casing problem is to use ratios of received fields to eliminate $k_i$ and $k_j$. As an illustrative example of this method, suppose the receiver borehole is not cased, so that $k_j$ is one. For a fixed position of the transmitter, one can take the ratio of fields at two different receiver positions A & B:

$$[B_{ij}(A)/B_{ij}(B)] = [G_{ij}(A)K^r_{ij}(A)k_i]/[G_{ij}(B)K^f_{ij}(B)k_i] \qquad (2)$$

Under those conditions, the casing attenuation $k_i$ cancels out. The $G_{ij}$s are known, so the full ratio yields a formation response ratio that is casing independent. Such response ratios can be fitted to models of the formation just as easily as the responses themselves. This method can easily be extended to double ratios if both boreholes are cased.

This method, however, has two principal problems: (1) the ratios are very sensitive to noise in the measured fields; and (2) in the modeling or inversion process, the use of ratio data reduces the sensitivity to variations in formation resistivity near the boreholes (e.g., near the transmitter borehole in the above example).

An alternative solution to the ratio approach described above can reduce the effects of noise by inverting the casing attenuation factors and formation property simultaneously. However, such an approach also reduces the sensitivity to variation in formation resistivity near the boreholes, which reduces the resolution of the resistivity/conductivity image obtained from the EM inversion/imaging. Imposing appropriate constraints on the casing attenuation factors can enhance the inversion.

Another solution, at least for the cross-borehole mode of operation, is to place an auxiliary receiver adjacent to the transmitter (or auxiliary transmitter adjacent to the receiver). Consider FIG. 2 for the case in which it is desired to find the casing correction for the transmitter when the receiver $R_j$ is in an open-hole. The field at the auxiliary receiver $B_{ik}$ is:

$$B_{ik}=G_{ik}k_ik_k \quad (3)$$

because the spacing between the transmitter and auxiliary receiver is too small for there to be any formation response. The field at the distant receiver is:

$$B_{ij}=G_{ij}K^f_{ij}k_i \quad (4)$$

If the auxiliary receiver $R_k$ is sufficiently far from the transmitter $T_i$, if $R_k$ and $T_i$ have the same coupling to the casing (i.e., same length of solenoid, same core and winding configuration, etc.), and if the casing is uniform along its length, then $k_i=k_k$ and so:

$$B_{ik}=G_{ik}k_i^2 \quad (5)$$

or $$k_i=\{B_{ik}/G_{ik}\}^{1/2} \quad (6)$$

Then $B_{ij}=G_{ij}K^f_{ij}\{B_{ik}/G_{ik}\}^{1/2}$ and this is easily solved for the desired formation response $K^f_{ij}$.

That method has been used in field tests, but some problems remain. For example, variations in casing properties may occur on a scale small compared to the spacing of the transmitter and auxiliary receiver, it may be impractical to make the auxiliary coil identical to the transmitter coil, or the transmitter may operate in a non-linear manner.

Another method combining multiple auxiliary receivers-transmitters with the ratio idea has been tried. This method uses an auxiliary transmitter and receiver as shown in FIG. 3. In this case, the receiver $R_j$ can also be used as a transmitter $T_j$ and its signal detected by the receiver $R_k$. So the field at $R_j$ from the main transmitter $T_i$ is given by:

$$B_{ij}=G_{ij}k_ik_j \quad (7)$$

and the field $B_{ik}$ at receiver $R_k$, is given by:

$$B_{ik}=G_{ik}k_ik_k \quad (8)$$

Finally, the field $B_{jk}$ at $R_k$ due to transmitter $T_j$ is given by:

$$B_{jk}=G_{jk}k_jk_k \quad (9)$$

Since all the Bs and Gs are known, there are three equations in three unknowns: and $k_i$, $k_j$ and $k_k$. One can solve for $k_i$ since the field at the distant site, now denoted with subscript A, is given by:

$$B_{iA}=G_{iA}K^f_{iA}k_i \quad (10)$$

and with $k_i$ known, one can determine the desired $K^f_{iA}$.

The latter multiple auxiliary system is straight-forward in concept, but is complicated to implement in a practical system because the tool actually lowered into the hole is long and heavy. It does, however, have the advantage that nonlinear effects at the transmitter are included in the casing attenuation factor $k_i$.

A related method uses what is known as the Remote-Field Eddy-Current (RFEC) principle to determine the inner diameter and/or the ratio of magnetic permeability to electric conductivity of a pipe. The method measures the mutual impedance of two induction coils (air-cored) separated by some distance and placed inside the pipe. That is one basis for non-destructively inspecting the conductive pipe that is widely used in the oilfield industry. The method, however, only permits an assessment of the inside of the pipe, and the results are highly sensitive to the variations in the magnetic permeability of the pipe, which can be significant. The method in general cannot be used to derive the EM signal attenuation through the pipe because of limitations on the parameters it can measure.

A method has been developed for use with non-magnetic casing by which measurement of the impedance of a transmitting (or receiving) solenoid at some frequency can be used to predict the attenuation of the field by the surrounding casing, as seen at a distant receiver (or from a distant transmitter). The method permits use of any frequency, irrespective of the conductivity of the casing or the thickness of the casing wall for casing having a given inner/outer diameter. The method is also applicable irrespective of the formation conductivity.

In addition, a method to predict the casing attenuation that is invariant with small changes in casing inner diameter was developed. One important finding is that both casing attenuation and impedance are simple functions of the product of the electric conductivity, thickness of the casing, and the operating EM frequency, which allows one to derive the casing attenuation factor directly from the impedance measurements.

SUMMARY

The present disclosure relates to determining the attenuation of an electromagnetic signal passing through a conductive material having a magnetic permeability greater than one. An antenna is provided and placed in relatively close proximity to the conductive material. An alternating current is passed through the antenna and the impedance of the antenna is measured. The attenuation is determined using the measured impedance. A single frequency measurement may be made, or multiple measurements using different frequencies may be made. Parameters based on properties of the material, for example, casing, and the frequency of the current are used to determine the attenuation. A measurement frequency is preferably within a frequency range in which the ratio of the antenna's resistance to the angular frequency of the current is substantially insensitive to at least one of the parameters.

BRIEF DESCRIPTION OF THE FIGURES

FIG. 1 is a schematic view of a prior art crosswell survey system in which transmitter $T_i$ produces a field $B_{ij}$ at receiver $R_j$ ($R_j$ is shown at two locations, A and B).

FIG. 2 is a schematic view of a prior art crosswell survey system in which transmitter $T_i$ produces a field $B_{ij}$ at receiver $R_j$ and a field $B_{ik}$ at receiver $R_k$.

Figure 3:
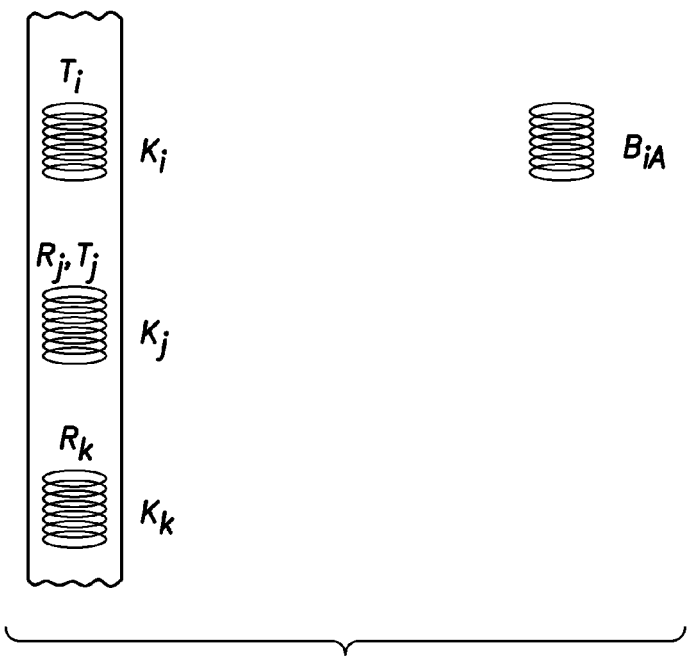
FIG. 3 is a schematic view of a prior art crosswell survey system in which transmitter $T_i$ produces a field $B_{ij}$ at receiver $R_j$, a field $B_{ik}$ at receiver $R_k$, and a field $B_{iA}$ at receiver $R_A$. In addition it uses an auxiliary transmitter $T_j$ co-located with receiver $R_j$.

It is to be understood that the drawings are to be used for the purpose of illustration only, and not to limit the scope of the appended claims.

DETAILED DESCRIPTION

Specific embodiments will now be described with reference to the figures. Like elements in the various figures will be referenced with like numbers for consistency. In the following description, numerous details are set forth to provide an understanding of the present disclosure. However, it will be understood by those skilled in the art that the present invention may be practiced without many of these details and that numerous variations or modifications from the described embodiments are possible.

The present disclosure applies, for example, to cross-borehole logging, land and/or marine surface-to-borehole logging, or in-hole logging by electromagnetic means when the holes are cased with conductive casing. Image results of such logging can be improved by eliminating or correcting for the variable attenuation of fields transmitted or received through casing that has inherent variations in conductivity, magnetic permeability, and thickness. To correct for casing attenuation when an EM signal propagates through conductive casing, measurements can be made on a solenoid (coil) to predict the casing attenuation factor at the solenoid with a magnetically permeable core. With magnetic steel casing, because of the introduction of magnetic permeability in the casing, the physics is more complicated than that for non-magnetic casing. Although casing parameters are coupled together in a complicated way, the casing attenuation factor can be expressed as a function of two physical parameters, one of which represents the magnetic property of the casing, and the other represents the electrical property of the casing. The impedance of the coil is also a function of the same two parameters. Various embodiments may be used to determine the casing parameters and casing attenuation in conductive measurements using single or multiple frequency impedance measurements.

As alluded to above, the casing attenuation is a function of two physical parameters that are products of casing properties and the EM frequency. In addition, the impedance of the transmitting or receiving coil is also a function of those same two parameters. Accordingly, several embodiments are described herein in which measurement of the impedance of a transmitting (or receiving) solenoid at one or a plurality of frequencies is used to predict the attenuation of the magnetic field by the surrounding casing, as seen at a distant receiver (or from a distant transmitter). Impedance measurement at a single frequency may be sufficient to predict the casing attenuation factor for any frequency, if the impedance measurement is nearly perfect or has an extremely low level of noise. In addition to the casing attenuation, products of casing properties (e.g., the product of conductivity and thickness, or the product of magnetic permeability and thickness) for a given casing outer diameter (OD) can be determined. Some embodiments are independent of frequency dispersion or radial variations of the magnetic permeability of the casing. Thus, many embodiments to determine the magnetic (and/or non-magnetic) casing parameters and casing attenuation factor from measurements of impedance of the transmitting or receiving coil, at one or a plurality of frequencies, are possible.

It is well known that the EM attenuation due to conductive casing depends on the EM frequency and the casing properties (e.g., electric conductivity σ, magnetic permeability μ, casing thickness t, and casing OD). It was also found that many different combinations of the casing properties could produce the same attenuation. However, how to combine the casing properties for a particular situation remains unsolved. As a result, it is difficult to uniquely determine the individual casing properties. If, however, there exists a set of parameters on which the EM attenuation uniquely depends, the casing attenuation can be easily obtained.

The casing attenuation factor can be expressed as a function of two parameters. Those parameters represent different combinations of the casing properties and the EM frequency. The relation is given by:

$$C = g(\alpha, \beta) \tag{11}$$

where C is the casing attenuation factor (the ratio of the EM signal propagating through casing and that without casing), and $$\alpha = (\mu - \mu_0) \cdot t \tag{12}$$

$$\beta = \sigma \cdot t \cdot \omega \tag{13}$$

where ω=2πf is the angular frequency, and f is the frequency in Hz.

The relations given in equations (11), (12), and (13) exhibit significant simplicity in describing a complex physical problem. Alpha (α) represents the magnetic induction in the casing (($\mu-\mu_0$)·t has the unit of magnetic inductance, i.e., henries), while β represents the electrical conduction in the casing (σ·t has the unit of electrical conductance, i.e., siemens). Notice that the angular frequency factor in β makes β have the unit of the inverse of inductance (i.e., 1/henry).

The development above is consistent with that for non-magnetic casing. In non-magnetic casing, the relative magnetic permeability becomes 1, making the casing attenuation factor only a function of β for a given casing OD since α becomes zero.

Figure 4A:
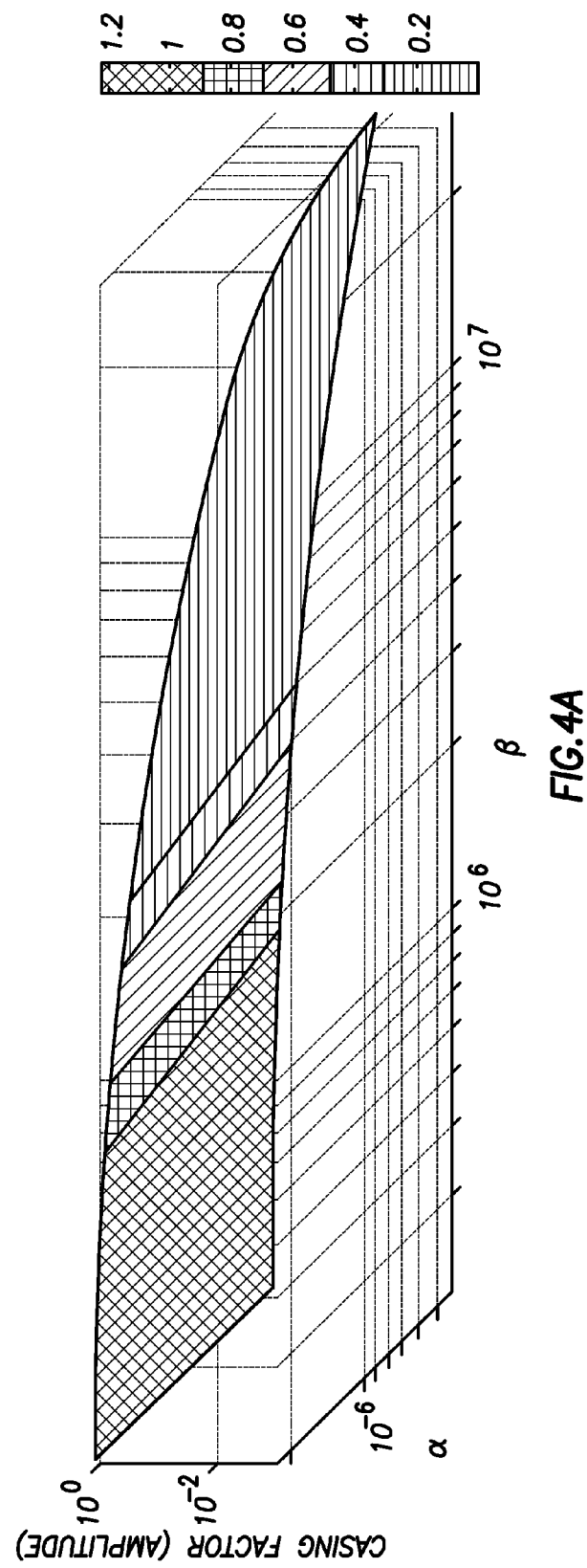
FIGS. 4A and 4B show two graphs in which the casing attenuation factor is plotted as a function of α and β, FIG. 4A corresponding to the amplitude, and FIG. 4B corresponding to the phase.
Figure 4B:
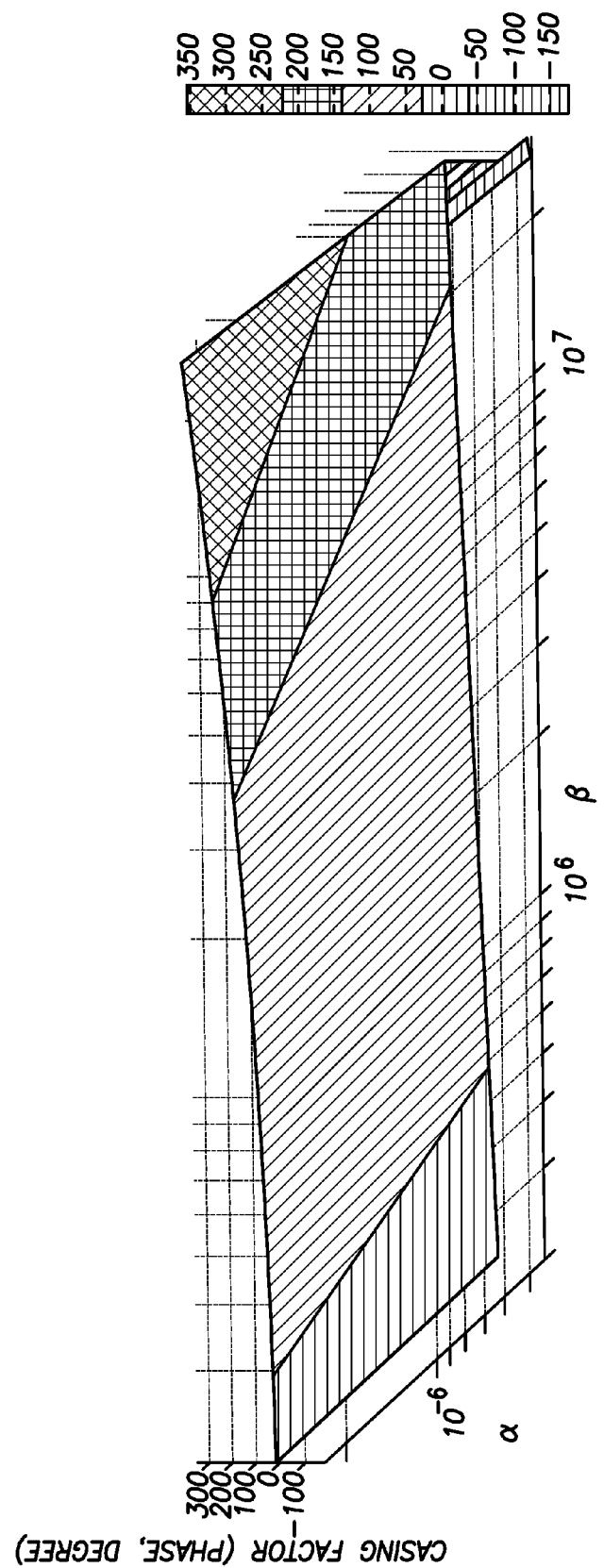

Notice that the relation given in Eq. (11) holds regardless of whether the coil has a magnetic core or is simply a single loop antenna. Simulation for a 7-inch OD casing with a Deep-Look™ receiver coil inside the casing was performed using a finite-element computer program, assuming axial symmetry in material properties. The simulation was performed over a wide range of casing conductivity, magnetic permeability, thickness, and EM frequency. The coil was modeled with a magnetic core with high permeability. FIGS. 4A and 4B give the resulting plots of the casing attenuation factor as a 2D function of α and β, with FIG. 4A showing the amplitude and FIG. 4B showing the phase (in degrees). FIGS. 4A and 4B show that the casing attenuation factor is a well-behaved function of α and β. The relationships shown in FIGS. 4A and 4B are valid for any coil provided that the correct coil parameters are input in the program. For a complex coil, lab experiments can be performed to obtain the correct relationship between the casing attenuation factor and (α, β) for that coil.

The impedance of the coil, the ratio of the drive voltage (V) to the current (I) that flows through it, is the sum of its resistance, R, and inductive reactance, L[dI/dt], where L is the coil's self-inductance. In general, for a sinusoidal drive on the coil with angular frequency ω, the complex impedance Z can be expressed as:

$$Z = R + i\omega L \qquad (14)$$

Dividing by ω on both sides yields:

$$Z/\omega = R/\omega + iL \qquad (15)$$

R/ω is considered a physically more significant parameter than R itself. R/ω has the same unit as L, which is henries.

One example of a practical transmitter or receiver is a long solenoid wrapped around a magnetically permeable core. Laminated mu-metal cores for receiver coils and silicon-steel core for transmitters are preferable, because with a highly permeable magnetic core, the coupling between the solenoid and the casing, when present, is greatly enhanced and, correspondingly, the sensitivity of the measurements to the casing parameters is much higher. The inductance and resistance of such a coil can be calculated with and without a permeable core, and in the presence of casing and in the absence of casing. When such a coil is inserted in casing, the induced currents in the casing produce a secondary field which threads the coil and induces what is known as a "back emf". This back emf is phase-shifted with respect to the drive voltage. Its in-phase component adds resistance to the coil, and its out-of-phase component changes the inductance of the coil. Thus, the coil impedance is changed by its coupling to the casing, and the changes depend on the properties of the casing. The impedance used is not limited to the self-impedance of the main winding, as described above, but could be any impedance which has sensitivity to the casing, such as the trans-impedance between two windings in a receiver coil.

The ratio of the impedance and the angular frequency can be expressed as a function of the same two parameters as the casing attenuation factor, and is given by:

$$Z/\omega = g'(\alpha, \beta) \qquad (16)$$

Figure 5A:
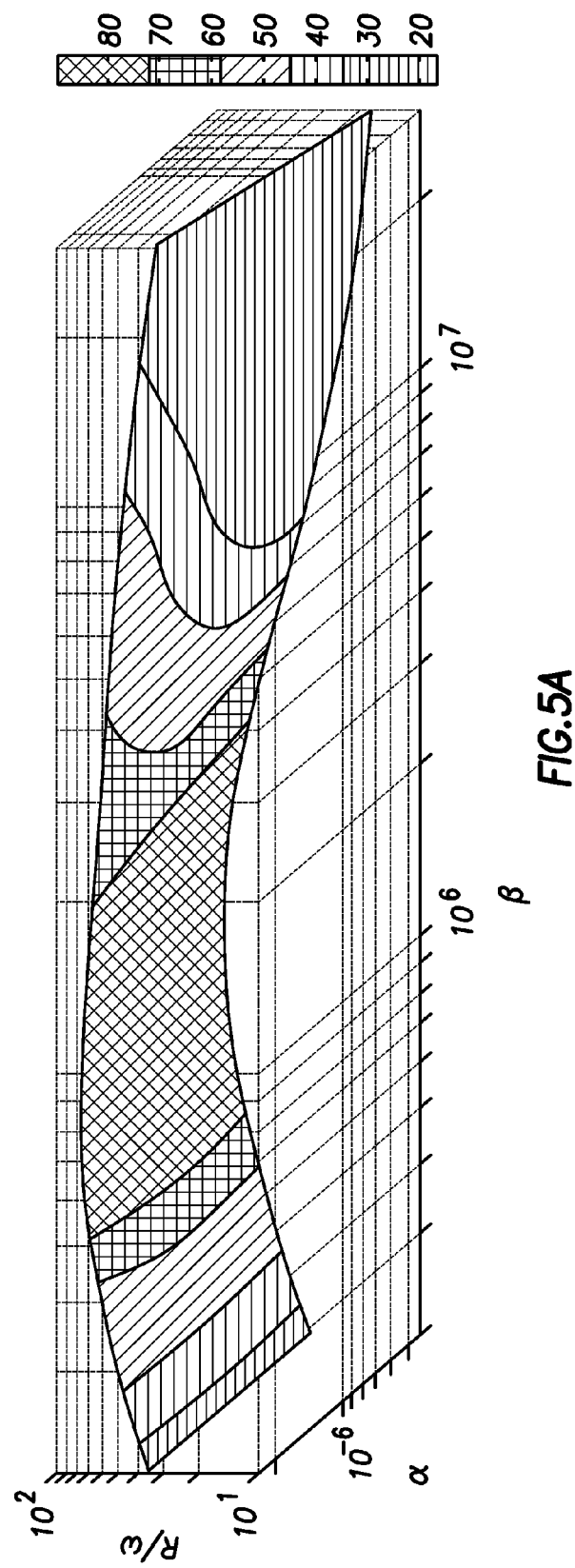
FIGS. 5A and 5B show two graphs in which Z/ω is plotted as a function of α and β, FIG. 5A corresponding to R/ω, and FIG. 5B corresponding to the coil inductance L.
Figure 5B:
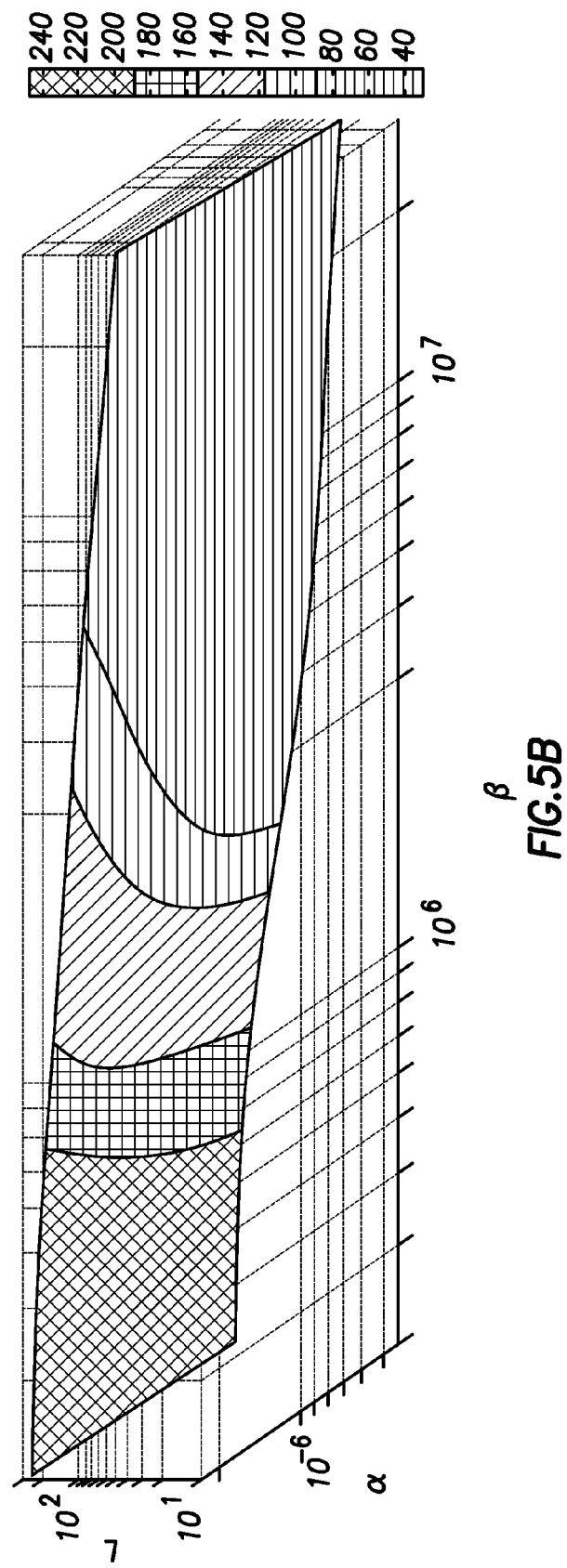

Similar to the above, simulations for a 7-inch OD casing were performed using a finite-element computer program, assuming axial symmetry in material properties. The simulation was performed over a wide range of casing conductivity, magnetic permeability, thickness, and EM frequency. The coil was modeled with a magnetic core with high magnetic permeability. FIGS. 5A and 5B give the resulting plots of Z/ω as a 2D function of α and β, with FIG. 5A showing the real portion, R/ω, and FIG. 5B showing the imaginary portion, L. FIGS. 5A and 5B show that Z/ω is a well-behaved function of α and β. Similar to the above, the relationships shown in FIGS. 5A and 5B are valid for any coil provided that the correct coil parameters are input in the program. For a complex coil, lab experiments can be performed to obtain the correct relationship between Z/ω and (α, β) for that coil.

This is consistent with the case of non-magnetic casing. In non-magnetic casing, the relative magnetic permeability becomes 1, which essentially makes Z/ω only a function of β.

It is noteworthy to point out that in addition to the α and β given in Eqs. (12) and (13), other pairs of parameters may also simplify the problem. For example, the casing attenuation factor and the induction coil impedance are also smooth functions of $(\omega\sigma/\mu)^{1/2}$ and $t(\omega\sigma\mu)^{1/2}$. While the embodiments described herein are based on the α and β given in Eqs. (12) and (13), because of their simplicity and physical clarity, that is not a limitation of scope.

Equations (11) and (16) show that both the casing attenuation factor and Z/ω are functions of α and β, which suggests that measurement of impedance can be used to determine the casing attenuation factor. It also suggests that a single frequency measurement of impedance might be enough to estimate the casing factor if the impedance measurement is nearly perfect. However, in reality, because impedance measurements almost always contain a certain level of noise, multi-frequency measurements are preferable to obtain accurate estimates of the casing attenuation factor. Based on Eqs. (11) and (16), various embodiments are possible.

Figure 9:
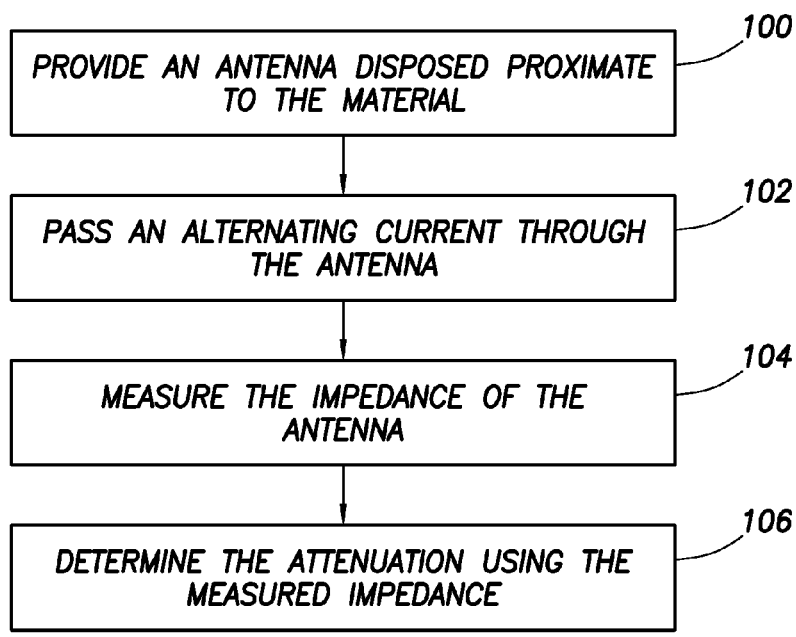
FIG. 9 is a flowchart showing one example embodiment of determining the attenuation of an electromagnetic signal passing through a conductive material having a magnetic permeability greater than one, in accordance with the present disclosure.

One example embodiment of determining the attenuation of an electromagnetic signal passing through a conductive material having a magnetic permeability greater than one is determined by performing the following steps (see FIG. 9). An antenna is provided and placed in relatively close proximity to the conductive material (step 100). An alternating current is passed through the antenna (step 102) and the impedance of the antenna is measured (step 104). The attenuation is determined using the measured impedance (step 106).

Figure 6A:
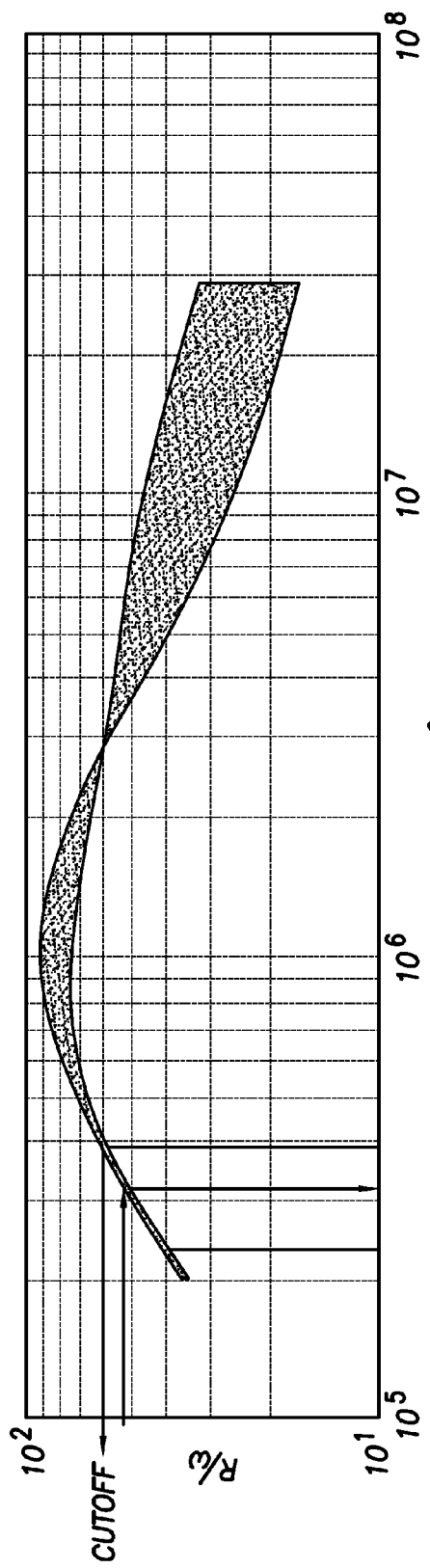
FIGS. 6A and 6B show plots of Z/ω versus β for all the α values on one plot, with FIG. 6A showing R/ω, and FIG. 6B showing L.
Figure 6B:
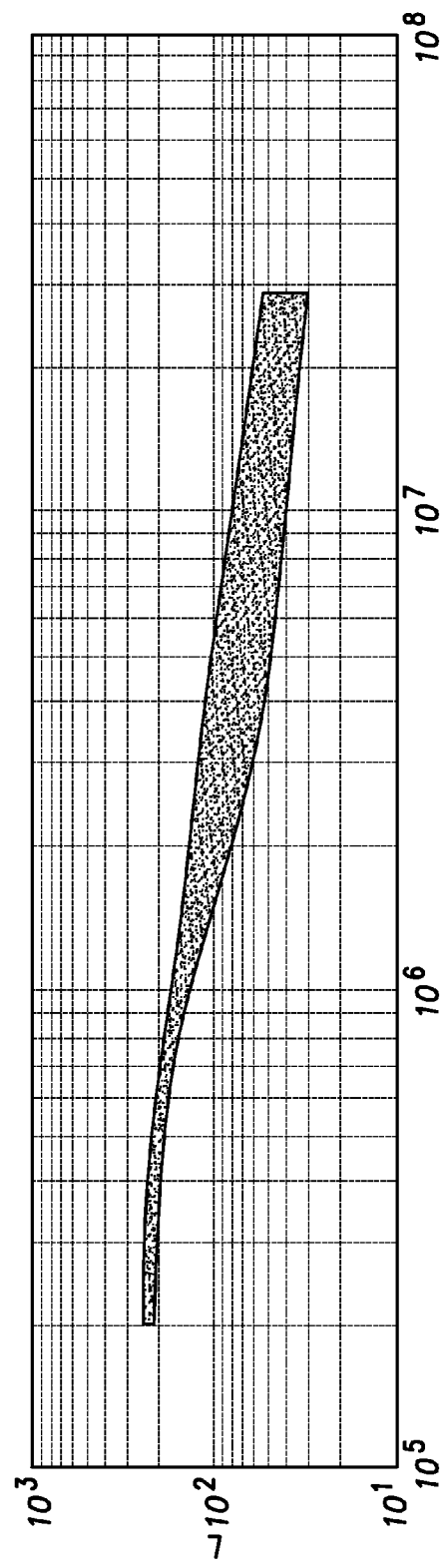
Figure 7A:
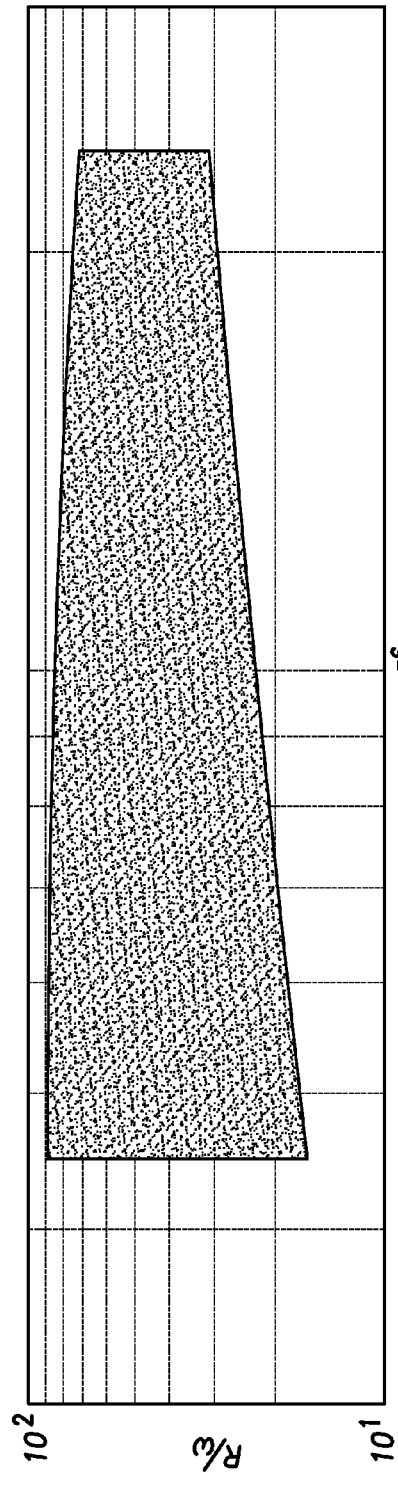
FIGS. 7A and 7B show plots of Z/ω versus α for all the β values on one plot, with FIG. 7A showing R/ω, and FIG. 7B showing L.
Figure 7B:
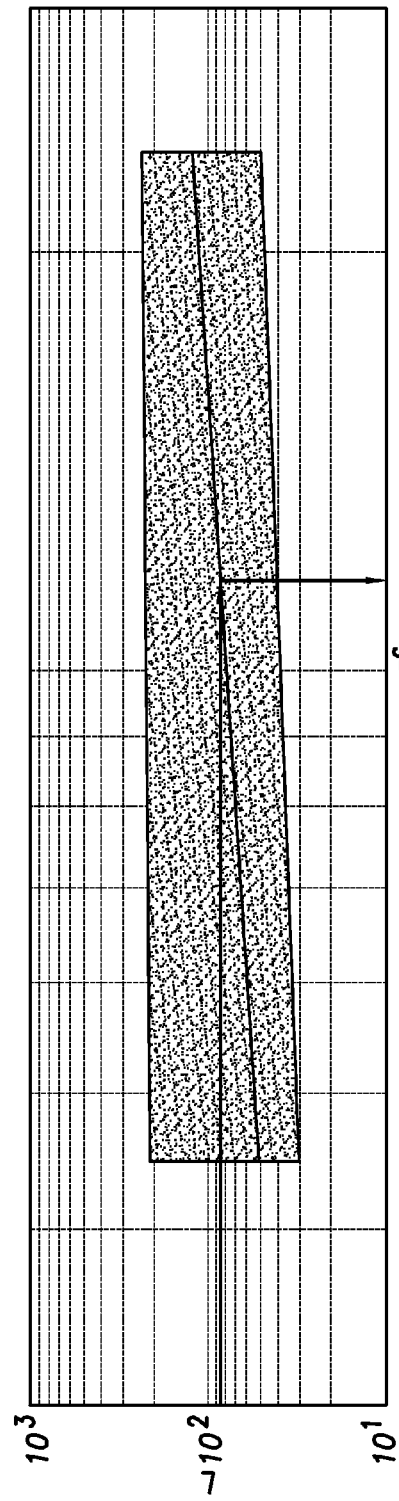

To provide a rich disclosure, five possible direct casing correction embodiments, D-1 to D-5, are described herein, though these are not meant to be limiting. Direct embodiments D-1 to D-4 depend on the re-plotting of FIGS. 5A and 5B in a different way, as shown in FIGS. 6A, 6B and FIGS. 7A, 7B. FIGS. 6A and 6B show the plot of Z/ω versus β for all the α values on one plot, with FIG. 6A showing R/ω, and FIG. 6B showing L. FIGS. 7A and 7B show the plot of Z/ω versus α for all the β values on one plot, with FIG. 7A showing R/ω, and FIG. 7B showing L. From FIGS. 6A and 6B, one can observe that there is a range of low β values (corresponding to a low frequency range), in which R/ω is almost insensitive to α. For that range of β values, and assuming a nominal conductivity of 4 million S/m and a casing wall thickness of 0.36 inches, the corresponding frequencies fall roughly between 1 and 2 Hz, for a 7-inch OD casing. This suggests that measurement of the impedance (R/ω) at frequencies between 1 and 2 Hz allows one to determine the value of β. After that, α can be obtained from FIG. 7A or 7B using R/ω or L for the previously-determined value of β. Finally, the casing attenuation factor can easily be obtained via the relation given by Eq. (11), based on the estimated α and β values. Various embodiments may be employed, depending on how many and which frequencies are used for the impedance measurements.

For a given casing OD and induction coil parameters, numerical modeling can be used to determine the (low) frequency range where R/ω is insensitive to α, as shown in FIGS. 6A and 6B. At a particular low frequency, $\omega_1$, that is within the frequency range in which R/ω is insensitive to α, the impedance is measured. However, it is often the case that the casing attenuation factor C is desired at another (normally higher) frequency $\omega_2$, for example, that used for the main survey. To determine the value of the casing attenuation factor C, the following steps can be performed: (1) $\beta(\omega_1)$ is obtained from $R/\omega_1$ using interpolation or curve-fitting (FIG. 6A); (2) at the determined $\beta(\omega_1)$, $\alpha(\omega_1)$ is obtained from $L(\omega_1)$ (FIG. 7B); (3) $\beta(\omega_1)$ is scaled to $\beta(\omega_2)$ by simple frequency scaling: $\beta(\omega_2)=\beta(\omega_1)\cdot\omega_2/\omega_1$; and (4) the casing attenuation factor is obtained from the $(\alpha, \beta)$ at $\omega_2$ using Eq. (11), as shown in FIGS. 4A and 4B. Thus, if both $\alpha$ and $\beta$ are determined from the impedance measurement at a single frequency $\omega_1$, then the casing attenuation factor at any other frequency can be derived afterwards.

Embodiment D-1 is appealing because impedance measurement at a single frequency can be used to estimate the casing attenuation at any other frequency. However, if the measurement is not perfect (e.g., due to noise), the measurement noise will bias the casing attenuation predictions. To address this problem, a multiple-frequency version D-2 of embodiment D-1 can be used. To reduce the effects of noise in impedance measurements, a list of low frequencies, $\omega_i$ (i=1 to N, N>1), that are within the frequency range in which $R/\omega$ is insensitive to $\alpha$ is developed. Impedance measurements are acquired at those frequencies. Recall, however, the casing attenuation factor C may be desired at another (normally higher) frequency, $\omega_2$. To determine that value of the casing attenuation factor C, the following steps can be performed: (1) $\beta(\omega_i)$ is obtained from $R/\omega_i$ from interpolation or curve-fitting (FIG. 6A) for all the frequencies in the low frequency list; (2) an average of $\beta(\omega_i)/\omega_i$ is taken to get the best estimate of $\sigma\cdot t$ and from that, the best estimates of $\beta(\omega_i)$ can be derived; (3) at each determined best estimate of $\beta(\omega_i)$, $\alpha(\omega_1)$ is obtained from $L(\omega_1)$ (FIG. 7B); (4) an average of $\alpha(\omega_1)$ is taken to get the best estimate of $\alpha$; (5) the determined best estimate of $(\alpha, \beta)$ at $\omega_2$ is obtained by simple frequency scaling; and (6) the casing attenuation factor is obtained using Eq. (11), as illustrated in FIGS. 4A and 4B.

Embodiment D-1 or D-2 uses an impedance measurement at one frequency or multiple frequencies in the low frequency range to get $(\alpha, \beta)$. Alternative embodiments D-3 or D-4 obtain $\alpha$ and $\beta$ separately from impedance measurements at two different frequencies or multiple frequencies in two frequency ranges. For embodiment D-3, at one particular low frequency $\omega_1$ that is within the frequency range in which $R/\omega$ is insensitive to $\alpha$, and at a particular high frequency, $\omega_2$, impedance measurements are acquired. In this example, the casing attenuation factor C is desired at yet another frequency, $\omega_3$ (though $\omega_3$ could be the same as $\omega_2$). To determine that value of the casing attenuation factor C, the following steps can be performed: (1) $\beta(\omega_1)$ is obtained from $R/\omega_1$ from interpolation or curve-fitting (FIG. 6A); (2) $\beta(\omega_1)$ is scaled to $\beta(\omega_2)$ by simple frequency scaling: $\beta(\omega_2)=\beta(\omega_1)\cdot\omega_2/\omega_1$; (3) at the determined $\beta(\omega_2)$, $\alpha(\omega_2)$ is obtained from $R/\omega_2$ or $L(\omega_2)$ or the combination of them, namely $Z/\omega_2$ (FIGS. 7A and 7B); (4) $\beta(\omega_2)$ is scaled to $\beta(\omega_3)$; and (5) the casing attenuation factor at $\omega_3$ is obtained from the determined $(\alpha, \beta)$ using Eq. (11).

It is noteworthy that for embodiment D-3, the obtained a could be more accurate because of the high-frequency measurement. At high frequency, impedance is more sensitive to $\alpha$, as seen in FIGS. 6A and 6B, and more choice of measurements among $R/\omega_2$, $L(\omega_2)$, or $Z/\omega_2$ can be used to determine $\alpha$. The D-3 embodiment is also independent of the frequency dispersion and/or the radial dispersion of the magnetic permeability (if it exists) if $\omega_2$ is chosen to be the target frequency for the casing attenuation factor.

Embodiment D-4 is a multiple-frequency variation of embodiment D-3. If the impedance measurements are not perfect, the noise in the measurements will bias the casing attenuation predictions derived from embodiment D-3. To reduce the effects of noise on the accuracy of the predicted casing attenuation factors, multiple-frequency impedance measurements can be used in both low and high-frequency ranges. A low frequency list, $\omega_{li}$ (i=1 to $N_l$, $N_l>1$), that are within the frequency range in which $R/\omega$ is insensitive to $\alpha$, and a high frequency list $\omega_{hj}$ (j=1 to $N_h$, $N_h>1$) are developed. Impedance measurements are acquired at those frequencies. However, the casing attenuation factor C is desired for another frequency $\omega_2$ (could be one of the frequencies in the high frequency list). To determine that value of the casing attenuation factor C, the following steps can be performed: (1) $\beta(\omega_{li})$ is obtained from $R/\omega_{li}$ from interpolation or curve-fitting (FIG. 6A) for all the frequencies in the low frequency list; (2) an average of $\beta(\omega_{li})/\omega_{li}$ is taken to get the best estimate of $\sigma\cdot t$, and the best estimates of $\beta(\omega_{lj})$ is derived by simple frequency scaling; (3) For each determined $\beta(\omega_{hj})$, $\alpha(\omega_{hj})$ is obtained from $R/\omega_{hj}$ or $L(\omega_{hj})$ or the combination of both, namely $Z/\omega_{hj}$ (FIGS. 7A and 7B); (4) an average of $\alpha(\omega_{hj})$ is taken to get the best estimate of $\alpha$; (5) the best $(\alpha, \beta)$ at $\omega_2$ is obtained by simple frequency scaling; and (6) the casing attenuation factor at $\omega_2$ is obtained using Eq. (11). It is anticipated that embodiment D-4 will perform best if the number of frequencies or measurements selected make the noise pattern in the data statistically random.

Notice that to use embodiments D-1 to D-4, impedance measurements at frequencies for which $R\omega$ is insensitive to $\alpha$ need to be acquired, which makes it necessary to determine the correct frequency list for impedance measurements. To do so, a cutoff value for $R/\omega$, as shown on FIG. 6A, can be used to determine whether the frequencies selected are correct or not.

A series of synthetic studies has been done to test the performance of the direct embodiments D-1 through D-4 mentioned above. In general, for noise-free data, one low frequency impedance measurement is enough to estimate the casing factor within 1% error in amplitude and 1 degree in phase. For real data, several low-frequency measurements and a few high-frequency measurements are needed to make sure the noise pattern is sufficiently random to suppress the effects of noise. The embodiments are simple, stable, and efficient.

Figure 8A:
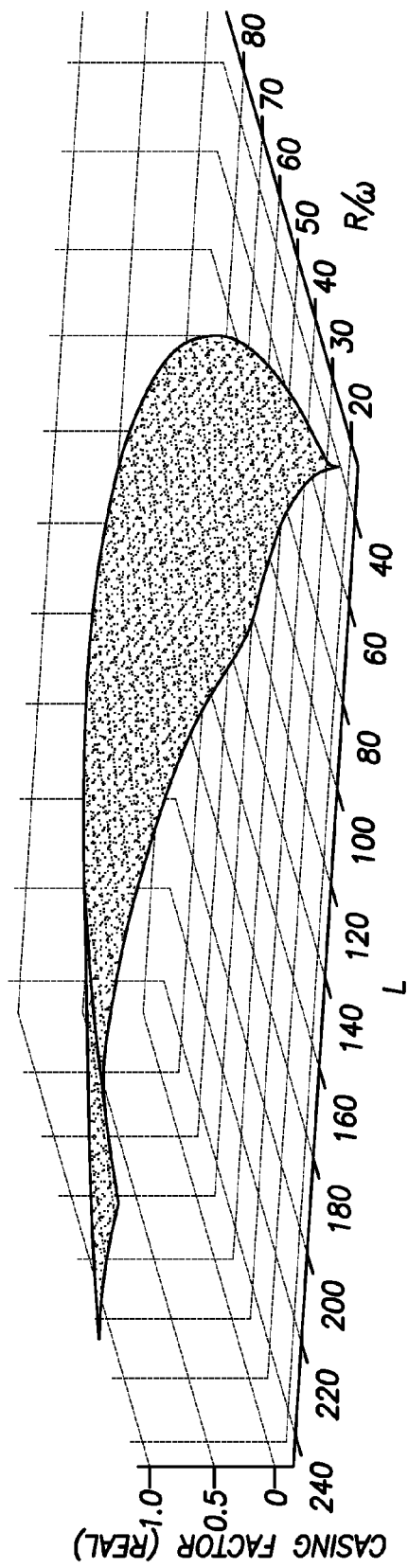
FIGS. 8A and 8B show plots of the casing attenuation factor as a function of R/ω and L, with FIG. 8A showing the real portion of the complex casing attenuation factor, and FIG. 8B showing the imaginary portion of the complex casing attenuation factor.
Figure 8B:
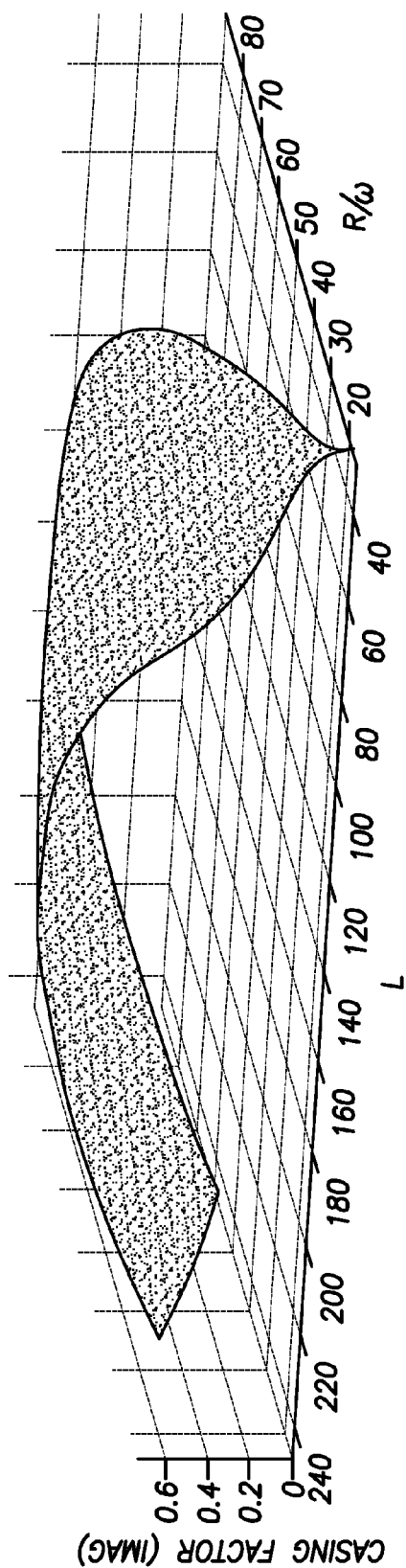

Because both the casing attenuation and the impedance are functions of the same two parameters, $\alpha$ and $\beta$, FIGS. 4A, 4B, 5A, and 5B can be combined to produce FIGS. 8A and 8B to reflect the direct relationship between the (complex) casing attenuation factor and the impedance measurements (embodiment D-5). The casing attenuation factor for a particular frequency can be easily obtained by the impedance measurement ($R/\omega$ and L) for that frequency. FIGS. 8A and 8B suggest that: (1) $R/\omega$ and L pairs are limited to a certain space; (2) the surface is twisted and there is a transition zone from low frequency to high frequency; and (3) some portion of the surface is rather steep, which makes the estimated casing attenuation factor highly sensitive to noise in the measurements.

Embodiment D-5 is sensitive to noise, while embodiments D-1 to D-4 need an impedance measurement at a frequency for which $R/\omega$ is insensitive to $\alpha$. There may be situations for which there is no measurement frequency that falls into the frequency range in which $R/\omega$ is insensitive to $\alpha$. If this situation occurs, an inversion can be performed. To help insure the inversion is stable and to reduce the effects of noise, multi-frequency impedance measurements are preferred, although single-frequency measurements may be used. Prior information can also be incorporated into the inversion. Available inversion approaches can be derivative-free, such as the Nelder Mead method (a multi-dimensional simplex method), an inversion involving derivatives, such as the Gauss-Newton method, or a global search method, such as Genetic Algorithms.

The basic idea is to invert for the two desired parameters: the term representing the magnetic induction of the casing $((\mu-\mu_0)\cdot t)$, and the term representing the electrical conduction of the casing $(\sigma\cdot t)$. This is done by minimizing a cost function constructed by some norm of the differences between the measured impedances and the simulated impedances. The casing attenuation factor can be determined at any frequency from the inverted $(\mu-\mu_0)\cdot t$ and $\sigma\cdot t\cdot\omega$ parameters via Eq. (11). The simulated impedance values are computed via 2-D interpolation from pre-computed or lab-measured data (e.g., stored on a hard drive) for $(\alpha, \beta)$ and impedance. The inversion can be constrained if there is good knowledge of the casing properties.

A series of synthetic exercises has been done to test the performance of the Nelder Mead method and Gauss-Newton approach. In general, inversion works reasonably well with results comparable to the direct methods (D-1-D-5). Inversion embodiments take more time to run than the direct methods, however, the inversion methods can be used when direct methods cannot (e.g., when there is no measurement frequency that falls in the frequency range in which $R/\omega$ is insensitive to $\alpha$).

While the invention has been described with respect to a limited number of embodiments, those skilled in the art, having benefit of this disclosure, will appreciate that other embodiments can be envisioned that do not depart from the scope of the invention as disclosed herein. Accordingly, the scope of the invention shall be limited only by the attached claims.

What is claimed is:

1. A method to determine the attenuation of an electromagnetic signal passing through a conductive material having a magnetic permeability greater than one, comprising:
    providing an antenna disposed adjacent the material;
    passing an alternating current through the antenna;
    measuring the impedance of the antenna; and
    determining the attenuation using the measured impedance;
    wherein the ratio of the antenna's resistance to the angular frequency of the current is substantially insensitive to a parameter based on properties of the material.

2. The method of claim 1, wherein the antenna includes a core having a high magnetic permeability.

3. The method of claim 1, further comprising using impedance measurements at multiple frequencies to minimize the effects of impedance measurement noise on the attenuation.

4. The method of claim 1, wherein determining the attenuation comprises using two parameters based on properties of the material and the frequency of the current.

5. The method of claim 4, wherein the properties of the material include its magnetic permeability, electrical conductivity, and thickness.

6. The method of claim 1, wherein determining the attenuation comprises determining a complex attenuation factor.

7. The method of claim 1, wherein the ratio of the antenna's resistive part of the impedance to the angular frequency of the current is substantially insensitive to a parameter based on properties of the material, and the determined attenuation is for a signal having a signal frequency different from the frequency of the current.

8. The method of claim 1, wherein determining the attenuation comprises using the real and imaginary portions of a complex attenuation factor.

9. A method to determine the attenuation of an electromagnetic signal passing through a conductive material having a magnetic permeability greater than one, comprising:
    providing an antenna disposed adjacent the material;
    passing an alternating current through the antenna, for a plurality of current frequencies;
    measuring the impedance of the antenna, for the plurality of current frequencies; and
    determining the attenuation using the impedance measurements;
    wherein the ratio of the antenna's resistance to the angular frequency of the current is substantially insensitive to a parameter based on properties of the material.

10. The method of claim 9, further comprising minimizing the effects of noise on the attenuation using the impedance measurements at multiple frequencies.

11. The method of claim 9, wherein determining the attenuation comprises using two parameters based on properties of the material and the frequencies of the current.

12. The method of claim 11, wherein the properties of the material include its magnetic permeability, electrical conductivity, and thickness.

13. The method of claim 9, wherein, for each current frequency, the ratio of the antenna's resistive part of the impedance to the angular frequency of the current is substantially insensitive to a parameter based on properties of the material, and the determined attenuation is for one or more signals, each signal having a signal frequency different from the current frequencies.

14. The method of claim 9, wherein:
    for a first current frequency among the plurality of frequencies, the ratio of the antenna's resistive part of the impedance to the angular frequency corresponding to the first current frequency is substantially insensitive to a first parameter based on properties of the material such that a second parameter can be determined at the first current frequency; and
    for a second current frequency among the plurality of frequencies, the ratio of the antenna's resistive part of the impedance to the angular frequency corresponding to the second current frequency and the inductive part of the impedance are sensitive to the first parameter such that the first parameter can be determined from a second parameter value at the second current frequency using the second parameter value at the first current frequency.

15. The method of claim 14, wherein the determined attenuation is for one or more signals, each signal having a signal frequency different from the first current frequency.

16. The method of claim 9, wherein:
    for a first set of current frequencies among the plurality of frequencies, the ratio of the antenna's resistive part of the impedance to the angular frequency for each frequency in the first set of current frequencies is substantially insensitive to a first parameter based on properties of the material such that a second parameter can be determined; and
    for a second set of current frequencies among the plurality of frequencies, the ratio of the antenna's resistive part of the impedance to the angular frequency and the inductive part of the impedance for each frequency in the second set of current frequencies are sensitive to the first parameter such that the first parameter can be determined from a second parameter value at the second current frequency using the second parameter value at the first current frequency.

17. The method of claim 16, wherein the determined attenuation is for one or more signals, each signal having a signal frequency different from the frequencies in the first set of current frequencies.

18. A method to determine the complex attenuation of an electromagnetic signal passing through a conductive material as a function of the complex impedance of an antenna, comprising:
- providing and disposing the antenna adjacent the material;
- passing an alternating current through the antenna, wherein the ratio of the antenna's resistance to the angular frequency of the current is substantially insensitive to a parameter based on properties of the material;
- measuring the impedance of the antenna;
- determining the complex attenuation factor as a first function of a first parameter and a second parameter using the measured impedance;
- determining the complex impedance as a second function of the first parameter and the second parameter using the measured impedance; and
- determining the complex attenuation as a function of the complex impedance using the first function and the second function.

19. A method to determine the attenuation of an electromagnetic signal passing through a conductive material, comprising:
- providing an antenna disposed adjacent the material;
- passing an alternating current through the antenna;
- measuring the impedance of the antenna; and
- performing an inversion to determine the attenuation;
  - wherein the ratio of the antenna's resistance to the angular frequency of the current is substantially insensitive to a parameter based on properties of the material.

20. The method of claim 19, wherein performing the inversion comprises determining two parameters based on properties of the material and the frequency of the current.

21. The method of claim 19, wherein performing the inversion comprises minimizing a cost function based on a norm of the difference between the measured impedance and the simulated impedance.

* * * * *